US008666590B2

(12) United States Patent
Follmer et al.

(10) Patent No.: US 8,666,590 B2
(45) Date of Patent: Mar. 4, 2014

(54) SYSTEM AND METHOD FOR NAMING, FILTERING, AND RECALL OF REMOTELY MONITORED EVENT DATA

(75) Inventors: Todd Follmer, Coto de Caza, CA (US); Scott McClellan, Heber City, UT (US)

(73) Assignee: inthinc Technology Solutions, Inc., West Valley City, UT (US)

(*) Notice: Subject to any disclaimer, the term of this patent is extended or adjusted under 35 U.S.C. 154(b) by 311 days.

(21) Appl. No.: 11/767,325

(22) Filed: Jun. 22, 2007

(65) Prior Publication Data

US 2008/0319604 A1 Dec. 25, 2008

(51) Int. Cl.

| | |
|---|---|
| ***G01M 17/00*** | (2006.01) |
| ***G06F 7/00*** | (2006.01) |
| ***G06F 19/00*** | (2011.01) |
| ***G06F 11/30*** | (2006.01) |
| ***G07C 5/00*** | (2006.01) |

(52) U.S. Cl.

USPC ............................ 701/32.2; 701/28; 701/29.1

(58) Field of Classification Search

USPC .......... 701/35, 1, 24, 28, 36, 29.1, 32.2, 33.3, 701/33.4

See application file for complete search history.

(56) References Cited

U.S. PATENT DOCUMENTS

| | | | | |
|---|---|---|---|---|
| 1,767,325 | A * | 6/1930 | Taylor | 294/82.16 |
| 3,975,708 | A | 8/1976 | Lusk | |
| 4,369,427 | A | 1/1983 | Drebinger et al. | |
| 4,395,624 | A | 7/1983 | Wartski | |
| 4,419,654 | A | 12/1983 | Funk | |
| 4,458,535 | A | 7/1984 | Juergens | |
| 4,785,280 | A | 11/1988 | Fubini | |
| 4,926,417 | A | 5/1990 | Futami | |
| 4,939,652 | A | 7/1990 | Steiner | |
| 5,032,821 | A | 7/1991 | Domanico | |
| 5,119,504 | A | 6/1992 | Durboraw, III | |
| 5,223,844 | A | 6/1993 | Mansell et al. | |
| 5,225,842 | A | 7/1993 | Brown et al. | |
| 5,303,163 | A | 4/1994 | Ebaugh et al. | 364/550 |
| 5,305,214 | A | 4/1994 | Komatsu | |
| 5,309,139 | A | 5/1994 | Austin | |
| 5,311,197 | A | 5/1994 | Sorden et al. | |
| 5,325,082 | A | 6/1994 | Rodriguez | |
| 5,347,260 | A | 9/1994 | Ginzel | |
| 5,359,528 | A | 10/1994 | Haendel | |

(Continued)

FOREIGN PATENT DOCUMENTS

| | | | |
|---|---|---|---|
| CA | 2071931 | 12/1993 | |
| DE | 197 00 353 A1 | 7/1998 | B60K 28/00 |
| WO | WO2005109369 | 11/2005 | |
| WO | WO2008109477 | 9/2008 | |

OTHER PUBLICATIONS

Ogle, et al.; *Accuracy of Global Positioning System for Determining Driver Performance Parameters*; Transportation Research Record 1818; Paper No. 02-1063; pp. 12-24.

(Continued)

*Primary Examiner* — Rami Khatib

(74) *Attorney, Agent, or Firm* — Workman Nydegger

(57) ABSTRACT

System and method for capturing video data, comprising buffering video data captured from a video recording device in a vehicle, detecting a triggering event, saving a portion of the video data occurring within a specified period of time near the event, and naming a saved portion of video data with a label associated with the triggering event.

45 Claims, 2 Drawing Sheets

(56) References Cited

U.S. PATENT DOCUMENTS

| | | | | |
|---|---|---|---|---|
| 5,365,114 | A | 11/1994 | Tsurushima | |
| 5,365,451 | A | 11/1994 | Wang et al. | |
| 5,394,136 | A | 2/1995 | Lammers | |
| 5,400,018 | A | 3/1995 | Scholl | |
| 5,414,432 | A | 5/1995 | Penny, Jr. et al. | |
| 5,422,624 | A | 6/1995 | Smith | |
| 5,424,584 | A | 6/1995 | Matsuda | |
| 5,430,432 | A | 7/1995 | Camhi | |
| 5,436,612 | A | 7/1995 | Aduddell | |
| 5,436,837 | A | 7/1995 | Gerstung | |
| 5,446,659 | A | 8/1995 | Yamawaki | |
| 5,453,939 | A | 9/1995 | Hoffman | |
| 5,457,439 | A | 10/1995 | Kuhn | |
| 5,475,597 | A | 12/1995 | Buck | |
| 5,485,161 | A | 1/1996 | Vaughn | |
| 5,499,182 | A | 3/1996 | Ousborne | |
| 5,521,579 | A | 5/1996 | Bernhard | |
| 5,521,580 | A | 5/1996 | Kaneko | |
| 5,525,960 | A | 6/1996 | McCall | |
| 5,548,273 | A | 8/1996 | Nicol | |
| 5,581,464 | A | 12/1996 | Woll | |
| 5,586,130 | A | 12/1996 | Doyle | |
| 5,600,558 | A | 2/1997 | Mearek | |
| 5,612,875 | A | 3/1997 | Haendel | |
| 5,625,337 | A | 4/1997 | Medawar | |
| 5,638,077 | A | 6/1997 | Martin | |
| 5,642,284 | A | 6/1997 | Parupalli | |
| 5,648,755 | A | 7/1997 | Yagihashi | |
| 5,659,289 | A | 8/1997 | Zonkoski | |
| 5,689,067 | A | 11/1997 | Klein | |
| 5,708,417 | A | 1/1998 | Tallman | |
| 5,717,374 | A | 2/1998 | Smith | |
| 5,719,771 | A | 2/1998 | Buck | |
| 5,723,768 | A | 3/1998 | Ammon | |
| 5,740,548 | A | 4/1998 | Hudgens | |
| 5,742,915 | A | 4/1998 | Stafford | |
| 5,751,245 | A | 5/1998 | Janky et al. | |
| 5,764,139 | A | 6/1998 | Nojima | |
| 5,767,767 | A | 6/1998 | Lima | |
| 5,777,580 | A | 7/1998 | Janky et al. | |
| 5,795,997 | A | 8/1998 | Gittins | |
| 5,797,134 | A | 8/1998 | McMillan et al. | |
| 5,801,618 | A | 9/1998 | Jenkins | |
| 5,801,948 | A | 9/1998 | Wood | |
| 5,815,071 | A | 9/1998 | Doyle | |
| 5,825,283 | A | 10/1998 | Camhi | |
| 5,825,284 | A | 10/1998 | Dunwoody | |
| 5,844,475 | A | 12/1998 | Horie | |
| 5,847,271 | A | 12/1998 | Poublon | |
| 5,862,500 | A | 1/1999 | Goodwin | |
| 5,867,093 | A | 2/1999 | Dodd | |
| 5,877,678 | A | 3/1999 | Donoho | |
| 5,880,674 | A | 3/1999 | Ufkes | |
| 5,880,958 | A | 3/1999 | Helms et al. | |
| 5,883,594 | A | 3/1999 | Lau | |
| 5,892,434 | A | 4/1999 | Carlson | |
| 5,907,277 | A | 5/1999 | Tokunaga | |
| 5,914,654 | A | 6/1999 | Smith | |
| 5,918,180 | A | 6/1999 | Dimino | |
| 5,926,087 | A | 7/1999 | Busch | |
| 5,928,291 | A | 7/1999 | Jenkins et al. | |
| 5,941,915 | A | 8/1999 | Federle et al. | 701/1 |
| 5,945,919 | A | 8/1999 | Trask | |
| 5,949,330 | A | 9/1999 | Hoffman | |
| 5,949,331 | A | 9/1999 | Schofield | |
| 5,954,781 | A | 9/1999 | Slepian | |
| 5,955,942 | A | 9/1999 | Slifkin | |
| 5,957,986 | A | 9/1999 | Coverdill | |
| 5,964,816 | A | 10/1999 | Kincaid | |
| 5,969,600 | A | 10/1999 | Tanguay | |
| 5,974,356 | A | 10/1999 | Doyle et al. | |
| 5,978,737 | A | 11/1999 | Pawlowski | |
| 5,982,278 | A | 11/1999 | Cuvelier | |
| 5,987,976 | A | 11/1999 | Sarangapani | |
| 5,999,125 | A | 12/1999 | Kurby | |
| 6,002,327 | A | 12/1999 | Boesch | |
| 6,008,724 | A | 12/1999 | Thompson | |
| 6,018,293 | A | 1/2000 | Smith | |
| 6,026,292 | A | 2/2000 | Coppinger et al. | |
| 6,028,508 | A | 2/2000 | Mason | |
| 6,028,510 | A | 2/2000 | Tamam | |
| 6,037,861 | A | 3/2000 | Ying | |
| 6,037,862 | A | 3/2000 | Ying | |
| 6,038,496 | A | 3/2000 | Dobler | |
| 6,044,315 | A | 3/2000 | Honeck | |
| 6,059,066 | A | 5/2000 | Lary | |
| 6,064,928 | A | 5/2000 | Wilson | |
| 6,064,970 | A | 5/2000 | McMillan et al. | |
| 6,067,008 | A | 5/2000 | Smith | |
| 6,067,009 | A | 5/2000 | Hozuka | |
| 6,072,388 | A | 6/2000 | Kyrtsos | |
| 6,073,007 | A | 6/2000 | Doyle | |
| 6,075,458 | A | 6/2000 | Ladner et al. | |
| 6,078,853 | A | 6/2000 | Ebner | |
| 6,081,188 | A | 6/2000 | Kutlucinar | |
| 6,084,870 | A | 7/2000 | Wooten et al. | |
| 6,094,149 | A | 7/2000 | Wilson | |
| 6,098,048 | A | 8/2000 | Dashefsky | |
| 6,100,792 | A | 8/2000 | Ogino | |
| 6,104,282 | A | 8/2000 | Fragoso | |
| 6,108,591 | A | 8/2000 | Segal et al. | |
| 6,121,922 | A | 9/2000 | Mohan | |
| 6,124,810 | A | 9/2000 | Segal et al. | |
| 6,130,608 | A | 10/2000 | McKeown | |
| 6,131,067 | A | 10/2000 | Girerd et al. | |
| 6,133,827 | A | 10/2000 | Alvey | |
| 6,141,610 | A | 10/2000 | Rothert | |
| 6,147,598 | A | 11/2000 | Murphy | |
| 6,172,602 | B1 | 1/2001 | Hasfjord | |
| 6,178,374 | B1 | 1/2001 | Möhlenkamp et al. | 701/117 |
| 6,184,784 | B1 | 2/2001 | Shibuya | |
| 6,185,501 | B1 | 2/2001 | Smith | |
| 6,198,995 | B1 | 3/2001 | Settles | |
| 6,204,756 | B1 | 3/2001 | Senyk | |
| 6,204,757 | B1 | 3/2001 | Evans | |
| 6,208,240 | B1 | 3/2001 | Ledesma | |
| 6,212,455 | B1 | 4/2001 | Weaver | |
| 6,216,066 | B1 | 4/2001 | Goebel | |
| 6,222,458 | B1 | 4/2001 | Harris | |
| 6,225,898 | B1 | 5/2001 | Kamiya | |
| 6,227,862 | B1 | 5/2001 | Harkness | |
| 6,229,438 | B1 | 5/2001 | Kutlucinar | |
| 6,232,873 | B1 | 5/2001 | Dilz | |
| 6,246,933 | B1 | 6/2001 | Bague | |
| 6,247,360 | B1 | 6/2001 | Anderson | |
| 6,249,219 | B1 | 6/2001 | Perez | |
| 6,253,129 | B1 | 6/2001 | Jenkins et al. | |
| 6,255,892 | B1 | 7/2001 | Gartner | |
| 6,255,939 | B1 | 7/2001 | Roth | |
| 6,262,658 | B1 | 7/2001 | O'Connor | |
| 6,265,989 | B1 | 7/2001 | Taylor | |
| 6,266,588 | B1 | 7/2001 | McClellan | |
| 6,278,361 | B1 | 8/2001 | Magiawala | |
| 6,285,931 | B1 | 9/2001 | Hattori | |
| 6,289,332 | B2 | 9/2001 | Menig | |
| 6,294,988 | B1 | 9/2001 | Shomura | |
| 6,294,989 | B1 | 9/2001 | Schofield | |
| 6,295,492 | B1 | 9/2001 | Lang | |
| 6,297,768 | B1 | 10/2001 | Allen, Jr. | |
| 6,301,533 | B1 | 10/2001 | Markow | |
| 6,306,063 | B1 | 10/2001 | Horgan et al. | 477/108 |
| 6,308,120 | B1 | 10/2001 | Good | |
| 6,308,134 | B1 | 10/2001 | Croyle et al. | |
| 6,313,742 | B1 | 11/2001 | Larson | |
| 6,320,497 | B1 | 11/2001 | Fukumoto | |
| 6,331,825 | B1 | 12/2001 | Ladner et al. | |
| 6,333,686 | B1 | 12/2001 | Waltzer | |
| 6,337,653 | B1 | 1/2002 | Bchler | |
| 6,339,739 | B1 | 1/2002 | Folke | |
| 6,339,745 | B1 | 1/2002 | Novik | 701/208 |
| 6,344,805 | B1 | 2/2002 | Yasui | |
| 6,351,211 | B1 | 2/2002 | Bussard | |

(56) References Cited

U.S. PATENT DOCUMENTS

| | | | | |
|---|---|---|---|---|
| 6,356,188 | B1 | 3/2002 | Meyers | |
| 6,356,822 | B1 | 3/2002 | Diaz | |
| 6,356,833 | B2 | 3/2002 | Jeon | |
| 6,356,836 | B1 | 3/2002 | Adolph | 701/208 |
| 6,359,554 | B1 | 3/2002 | Skibinski | |
| 6,362,730 | B2 | 3/2002 | Razavi | |
| 6,362,734 | B1 | 3/2002 | McQuade | |
| 6,366,199 | B1 | 4/2002 | Osbom | |
| 6,378,959 | B2 | 4/2002 | Lesesky | |
| 6,389,340 | B1 | 5/2002 | Rayner | |
| 6,393,348 | B1 | 5/2002 | Ziegler | |
| 6,404,329 | B1 | 6/2002 | Hsu | |
| 6,405,112 | B1 | 6/2002 | Rayner | |
| 6,405,128 | B1 | 6/2002 | Bechtolsheim et al. | 701/208 |
| 6,415,226 | B1 | 7/2002 | Kozak | 701/210 |
| 6,424,268 | B1 | 7/2002 | Isonaga | |
| 6,427,687 | B1 | 8/2002 | Kirk | |
| 6,430,488 | B1 | 8/2002 | Goldman | |
| 6,433,681 | B1 | 8/2002 | Foo | |
| 6,441,732 | B1 | 8/2002 | Laitsaari | |
| 6,449,540 | B1 | 9/2002 | Rayner | |
| 6,459,367 | B1 | 10/2002 | Green | |
| 6,459,369 | B1 | 10/2002 | Wang | |
| 6,459,961 | B1 | 10/2002 | Obradovich | |
| 6,459,969 | B1 | 10/2002 | Bates | |
| 6,462,675 | B1 | 10/2002 | Humphrey | |
| 6,472,979 | B2 | 10/2002 | Schofield | |
| 6,476,763 | B2 | 11/2002 | Allen, Jr. | |
| 6,480,106 | B1 | 11/2002 | Crombez | |
| 6,484,035 | B2 | 11/2002 | Allen, Jr. | |
| 6,484,091 | B2 | 11/2002 | Shibata | |
| 6,493,650 | B1 | 12/2002 | Rodgers | |
| 6,512,969 | B1 | 1/2003 | Wang | |
| 6,515,596 | B2 | 2/2003 | Awada | |
| 6,519,512 | B1 | 2/2003 | Haas | |
| 6,525,672 | B2 | 2/2003 | Chainer | |
| 6,526,341 | B1 | 2/2003 | Bird et al. | |
| 6,529,159 | B1 | 3/2003 | Fan et al. | |
| 6,535,116 | B1 | 3/2003 | Zhou | |
| 6,542,074 | B1 | 4/2003 | Tharman | |
| 6,542,794 | B2 | 4/2003 | Obradovich | |
| 6,549,834 | B2 | 4/2003 | McClellan | |
| 6,552,682 | B1 | 4/2003 | Fan | |
| 6,556,905 | B1 | 4/2003 | Mittelsteadt | |
| 6,559,769 | B2 | 5/2003 | Anthony | |
| 6,564,126 | B1 | 5/2003 | Lin | |
| 6,567,000 | B2 | 5/2003 | Slifkin | |
| 6,571,168 | B1 | 5/2003 | Murphy | |
| 6,587,759 | B2 | 7/2003 | Obradovich | |
| 6,594,579 | B1 | 7/2003 | Lowrey | |
| 6,599,243 | B2 | 7/2003 | Woltermann | |
| 6,600,985 | B2 | 7/2003 | Weaver | |
| 6,604,033 | B1 | 8/2003 | Banet | |
| 6,609,063 | B1 | 8/2003 | Bender et al. | 701/209 |
| 6,609,064 | B1 | 8/2003 | Dean | 701/213 |
| 6,611,740 | B2 | 8/2003 | Lowrey | |
| 6,611,755 | B1 | 8/2003 | Coffee | |
| 6,622,085 | B1 | 9/2003 | Amita et al. | 701/208 |
| 6,629,029 | B1 | 9/2003 | Giles | |
| 6,630,884 | B1 | 10/2003 | Shanmugham | |
| 6,631,322 | B1 | 10/2003 | Arthur et al. | 701/211 |
| 6,636,790 | B1 | 10/2003 | Lightner | |
| 6,639,512 | B1 | 10/2003 | Lee et al. | |
| 6,643,578 | B2 | 11/2003 | Levine | |
| 6,651,001 | B2 | 11/2003 | Apsell | |
| 6,654,682 | B2 | 11/2003 | Kane et al. | |
| 6,657,540 | B2 | 12/2003 | Knapp | |
| 6,662,013 | B2 | 12/2003 | Takiguchi et al. | |
| 6,662,141 | B2 | 12/2003 | Kaub | 702/181 |
| 6,664,922 | B1 | 12/2003 | Fan | |
| 6,665,613 | B2 | 12/2003 | Duvall | |
| 6,674,362 | B2 | 1/2004 | Yoshioka | |
| 6,675,085 | B2 | 1/2004 | Straub | |
| 6,677,854 | B2 | 1/2004 | Dix | |
| 6,678,612 | B1 | 1/2004 | Khawam | |
| 6,696,932 | B2 | 2/2004 | Skibinski | |
| 6,703,925 | B2 | 3/2004 | Steffel | |
| 6,710,738 | B2 | 3/2004 | Allen, Jr. | |
| 6,714,894 | B1 | 3/2004 | Tobey et al. | 702/188 |
| 6,718,235 | B1 | 4/2004 | Borugian | |
| 6,718,239 | B2 | 4/2004 | Rayner | |
| 6,727,809 | B1 | 4/2004 | Smith | |
| 6,728,605 | B2 | 4/2004 | Lash | |
| 6,732,031 | B1 | 5/2004 | Lightner | |
| 6,732,032 | B1 | 5/2004 | Banet | |
| 6,737,962 | B2 | 5/2004 | Mayor | |
| 6,741,169 | B2 | 5/2004 | Magiawala | |
| 6,741,170 | B2 | 5/2004 | Alrabady | |
| 6,745,153 | B2 | 6/2004 | White | |
| 6,748,322 | B1 | 6/2004 | Fernandez | |
| 6,750,761 | B1 | 6/2004 | Newman | |
| 6,750,762 | B1 | 6/2004 | Porter | |
| 6,756,916 | B2 | 6/2004 | Yanai | |
| 6,759,952 | B2 | 7/2004 | Dunbridge | |
| 6,766,244 | B2 | 7/2004 | Obata et al. | 701/207 |
| 6,768,448 | B2 | 7/2004 | Farmer | |
| 6,775,602 | B2 | 8/2004 | Gordon | |
| 6,778,068 | B2 | 8/2004 | Wolfe | |
| 6,778,885 | B2 | 8/2004 | Agashe et al. | |
| 6,784,793 | B2 | 8/2004 | Gagnon | |
| 6,784,832 | B2 | 8/2004 | Knockeart et al. | |
| 6,788,196 | B2 | 9/2004 | Ueda | |
| 6,788,207 | B2 | 9/2004 | Wilkerson | |
| 6,792,339 | B2 | 9/2004 | Basson | |
| 6,795,017 | B1 | 9/2004 | Puranik et al. | |
| 6,798,354 | B2 | 9/2004 | Schuessler | |
| 6,803,854 | B1 | 10/2004 | Adams et al. | |
| 6,807,481 | B1 | 10/2004 | Gastelum | |
| 6,813,549 | B2 | 11/2004 | Good | |
| 6,819,236 | B2 | 11/2004 | Kawai | |
| 6,832,141 | B2 | 12/2004 | Skeen et al. | |
| 6,845,314 | B2 | 1/2005 | Fosseen | |
| 6,845,316 | B2 | 1/2005 | Yates | 701/117 |
| 6,845,317 | B2 | 1/2005 | Craine | |
| 6,847,871 | B2 | 1/2005 | Malik et al. | 701/33 |
| 6,847,872 | B2 | 1/2005 | Bodin | |
| 6,847,873 | B1 | 1/2005 | Li | |
| 6,847,887 | B1 | 1/2005 | Casino | 701/208 |
| 6,850,841 | B1 | 2/2005 | Casino | 701/208 |
| 6,859,039 | B2 | 2/2005 | Horie | |
| 6,859,695 | B2 | 2/2005 | Klausner | |
| 6,865,457 | B1 | 3/2005 | Mittelsteadt | |
| 6,867,733 | B2 | 3/2005 | Sandhu et al. | |
| 6,868,386 | B1 | 3/2005 | Henderson et al. | |
| 6,870,469 | B2 | 3/2005 | Ueda | |
| 6,873,253 | B2 | 3/2005 | Veziris | |
| 6,873,261 | B2 | 3/2005 | Anthony | |
| 6,879,894 | B1 | 4/2005 | Lightner | |
| 6,885,293 | B2 | 4/2005 | Okumura | |
| 6,892,131 | B2 | 5/2005 | Coffee | |
| 6,894,606 | B2 | 5/2005 | Forbes et al. | 340/435 |
| 6,895,332 | B2 | 5/2005 | King | |
| 6,909,398 | B2 | 6/2005 | Knockeart et al. | |
| 6,914,523 | B2 | 7/2005 | Munch | |
| 6,922,133 | B2 | 7/2005 | Wolfe | |
| 6,922,616 | B2 | 7/2005 | Obradovich | |
| 6,922,622 | B2 | 7/2005 | Dulin | |
| 6,925,425 | B2 | 8/2005 | Remboski | |
| 6,928,348 | B1 | 8/2005 | Lightner | |
| 6,937,162 | B2 | 8/2005 | Tokitsu | |
| 6,950,013 | B2 | 9/2005 | Scaman | |
| 6,954,140 | B2 | 10/2005 | Holler | |
| 6,958,976 | B2 | 10/2005 | Kikkawa | |
| 6,965,827 | B1 | 11/2005 | Wolfson | 701/207 |
| 6,968,311 | B2 | 11/2005 | Knockeart et al. | |
| 6,970,075 | B2 | 11/2005 | Cherouny | |
| 6,970,783 | B2 | 11/2005 | Knockeart et al. | |

(56) References Cited

U.S. PATENT DOCUMENTS 6,972,669 B2 12/2005 Saito
6,980,131 B1 12/2005 Taylor
6,981,565 B2 1/2006 Gleacher
6,982,636 B1 1/2006 Bennie
6,983,200 B2 1/2006 Bodin
6,988,033 B1 1/2006 Lowrey
6,988,034 B1 1/2006 Marlatt et al. ................ 701/200
6,989,739 B2 1/2006 Li
7,002,454 B1 2/2006 Gustafson
7,002,579 B2 2/2006 Olson
7,005,975 B2 2/2006 Lehner
7,006,820 B1 2/2006 Parker et al.
7,012,632 B2 * 3/2006 Freeman et al. .............. 348/148
7,019,641 B1 3/2006 Lakshmanan
7,020,548 B2 * 3/2006 Saito et al. ................... 701/32.6
7,023,321 B2 4/2006 Brillon et al.
7,023,332 B2 4/2006 Saito
7,024,318 B2 4/2006 Fischer
7,027,808 B2 4/2006 Wesby
7,034,705 B2 4/2006 Yoshioka
7,038,578 B2 5/2006 Will
7,042,347 B2 5/2006 Cherouny
7,047,114 B1 5/2006 Rogers
7,049,941 B2 5/2006 Rivera-Cintron
7,054,742 B2 5/2006 Khavakh et al. .............. 701/209
7,059,689 B2 6/2006 Lesesky
7,069,126 B2 6/2006 Bernard
7,069,134 B2 6/2006 Williams
7,072,753 B2 7/2006 Eberle
7,081,811 B2 7/2006 Johnston
7,084,755 B1 8/2006 Nord
7,088,225 B2 8/2006 Yoshioka
7,089,116 B2 8/2006 Smith
7,091,880 B2 8/2006 Sorensen
7,098,812 B2 8/2006 Hirota
7,099,750 B2 8/2006 Miyazawa
7,099,774 B2 8/2006 King
7,102,496 B1 9/2006 Ernst
7,109,853 B1 9/2006 Mattson
7,113,081 B1 9/2006 Reichow
7,113,107 B2 9/2006 Taylor
7,117,075 B1 10/2006 Larschan et al.
7,119,696 B2 10/2006 Borugian
7,124,027 B1 10/2006 Ernst
7,124,088 B2 10/2006 Bauer et al.
7,129,825 B2 10/2006 Weber
7,132,934 B2 11/2006 Allison
7,132,937 B2 11/2006 Lu et al.
7,132,938 B2 11/2006 Suzuki
7,133,755 B2 11/2006 Salman
7,135,983 B2 11/2006 Filippov
7,138,916 B2 11/2006 Schwartz
7,139,661 B2 11/2006 Holze
7,145,442 B1 12/2006 Wai
7,149,206 B2 12/2006 Pruzan
7,155,321 B2 12/2006 Bromley et al. ................ 701/29
7,161,473 B2 1/2007 Hoshal
7,164,986 B2 1/2007 Humphries
7,170,390 B2 1/2007 Quiñones
7,170,400 B2 1/2007 Cowelchuk
7,174,243 B1 2/2007 Lightner
7,180,407 B1 2/2007 Guo
7,180,409 B2 2/2007 Brey
7,187,271 B2 3/2007 Nagata
7,196,629 B2 3/2007 Ruoss
7,197,500 B1 3/2007 Israni et al. ................... 707/100
7,216,022 B2 5/2007 Kynast et al. ..................... 701/1
7,216,035 B2 5/2007 Hörtner
7,218,211 B2 5/2007 Ho
7,222,009 B2 5/2007 Hijikata
7,225,065 B1 5/2007 Hunt
7,228,211 B1 6/2007 Lowrey
7,233,235 B2 6/2007 Pavlish
7,236,862 B2 6/2007 Kanno
7,239,948 B2 7/2007 Nimmo
7,256,686 B2 8/2007 Koutsky
7,256,700 B1 8/2007 Ruocco
7,256,702 B2 8/2007 Isaacs
7,260,497 B2 8/2007 Watabe
RE39,845 E 9/2007 Hasfjord
7,269,507 B2 9/2007 Cayford ........................ 701/208
7,269,530 B1 9/2007 Lin
7,271,716 B2 9/2007 Nou
7,273,172 B2 9/2007 Olsen
7,280,046 B2 10/2007 Berg
7,283,904 B2 10/2007 Benjamin
7,286,917 B2 10/2007 Hawkins
7,286,929 B2 10/2007 Staton
7,289,024 B2 10/2007 Sumcad
7,289,035 B2 10/2007 Nathan
7,292,152 B2 11/2007 Torkkola
7,292,159 B2 11/2007 Culpepper
7,298,248 B2 11/2007 Finley
7,298,249 B2 11/2007 Avery
7,301,445 B2 11/2007 Moughler
7,317,383 B2 1/2008 Ihara
7,317,392 B2 1/2008 DuRocher
7,317,927 B2 1/2008 Staton
7,319,848 B2 1/2008 Obradovich
7,321,294 B2 1/2008 Mizumaki
7,321,825 B2 1/2008 Ranalli
7,323,972 B2 1/2008 Nobusawa
7,323,974 B2 1/2008 Schmid
7,323,982 B2 1/2008 Staton
7,327,239 B2 2/2008 Gallant
7,327,258 B2 2/2008 Fast
7,333,883 B2 2/2008 Geborek
7,339,460 B2 3/2008 Lane
7,349,782 B2 3/2008 Churchill
7,352,081 B2 4/2008 Taurasi
7,355,508 B2 4/2008 Mian
7,365,639 B2 4/2008 Yuhara
7,366,551 B1 4/2008 Hartley
7,375,624 B2 5/2008 Hines
7,376,499 B2 5/2008 Salman
7,378,946 B2 5/2008 Lahr
7,378,949 B2 5/2008 Chen
7,386,394 B2 6/2008 Shulman
7,421,334 B2 9/2008 Dahlgren et al. ............. 701/117
7,433,889 B1 10/2008 Barton ....................... 707/104.1
7,447,509 B2 11/2008 Cossins et al. ................ 455/457
7,499,949 B2 3/2009 Barton ....................... 707/104.1
7,565,230 B2 7/2009 Gardner et al. ................. 701/35
7,706,940 B2 * 4/2010 Itatsu ........................... 701/32.6
7,880,642 B2 2/2011 Gueziec ........................ 340/905
7,898,388 B2 3/2011 Ehrman et al. ................. 340/5.8
7,941,258 B1 5/2011 Mittelsteadt et al. ........... 701/35
8,150,628 B2 * 4/2012 Hyde et al. ...................... 702/19
8,311,277 B2 * 11/2012 Peleg et al. ................... 382/103
2001/0018628 A1 8/2001 Jenkins et al. .................. 701/35
2002/0005895 A1 * 1/2002 Freeman et al. .............. 348/143
2002/0024444 A1 2/2002 Hiyama et al. ................ 340/576
2002/0103622 A1 * 8/2002 Burge .......................... 702/183
2003/0055555 A1 3/2003 Knockeart et al.
2004/0039504 A1 2/2004 Coffee et al.
2004/0066330 A1 4/2004 Knockeart et al.
2004/0077339 A1 4/2004 Martens
2004/0083041 A1 4/2004 Skeen et al.
2004/0138794 A1 * 7/2004 Saito et al. ...................... 701/35
2004/0142672 A1 7/2004 Stankewitz
2004/0143602 A1 * 7/2004 Ruiz et al. .................. 707/104.1
2004/0210353 A1 10/2004 Rice .................................. 701/1
2004/0236474 A1 11/2004 Chowdhary et al. .............. 701/1
2005/0064835 A1 3/2005 Gusler
2005/0091018 A1 4/2005 Craft
2005/0096809 A1 5/2005 Skeen et al.
2005/0137757 A1 6/2005 Phelan et al.
2006/0080359 A1 * 4/2006 Powell et al. .............. 707/104.1
2006/0154687 A1 7/2006 McDowell

(56) References Cited

U.S. PATENT DOCUMENTS

| | | | | |
|---|---|---|---|---|
| 2006/0190822 | A1* | 8/2006 | Basson et al. | 715/700 |
| 2006/0234711 | A1 | 10/2006 | McArdle | |
| 2007/0040928 | A1* | 2/2007 | Jung et al. | 348/362 |
| 2007/0124332 | A1* | 5/2007 | Ballesty et al. | 707/104.1 |
| 2007/0136078 | A1* | 6/2007 | Plante | 705/1 |
| 2007/0229234 | A1 | 10/2007 | Smith | |
| 2007/0293206 | A1 | 12/2007 | Lund | |
| 2008/0064413 | A1 | 3/2008 | Breed | |
| 2008/0122603 | A1* | 5/2008 | Plante et al. | 340/439 |
| 2008/0255888 | A1 | 10/2008 | Berkobin | |
| 2010/0033577 | A1* | 2/2010 | Doak et al. | 348/159 |

OTHER PUBLICATIONS

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

* cited by examiner

SYSTEM AND METHOD FOR NAMING, FILTERING, AND RECALL OF REMOTELY MONITORED EVENT DATA

TECHNICAL FIELD

The present invention relates generally to a system and method for tagging data files and, more particularly, to a system and method for tagging and recalling video data files for a driver monitoring system.

BACKGROUND

Video monitoring of vehicle drivers and passengers is known; however, existing vehicle video monitoring systems do not provide easily useable video files for use by personnel who supervise drivers or review their behavior. Current systems merely provide a digital or analog recording for an entire driving shift without any markers, tags or other indication of where questionable driver behavior may be found in the recording. As a result, a supervisor or person analyzing driver behavior must view the video recording and/or exceptions for an entire shift, week, month, or longer to identify incidents of poor driving behavior, such as failure to use a seatbelt, use of a cell phone while driving, or failure to pay attention to the road, aggressive driving, and/or impact events. This method is very inefficient and difficult to use, particularly if the driver's shift is an entire workday, which may require the supervisor to review an 8 hour or longer video for each driver.

One known method for processing long video recordings of drivers is to have a third party review the entire recording and to break the recording into segments each time a new violation occurs. For example, the third party reviewer may watch the video for an entire driving shift and breaks the video file into separate sub-files each time the reviewer observes the driver in the video commit a violation, such as driving without a seatbelt, using a cell phone, or not paying attention to the road. In known systems, these sub-files are marked with minimal information, such as a date/time stamp, that is not helpful to a supervisor or reviewer who is looking for particular types of violations or who wants to prioritize his review to more serious violations.

SUMMARY OF THE INVENTION

The present invention is directed generally to a system and method for capturing video data, comprising buffering video data captured from a video recording device in a vehicle, detecting a triggering event, saving a portion of the video data occurring within a specified period of time near the event, and naming a saved portion of video data with a label associated with the triggering event. The video data may be video of a driver of a vehicle, occupants of a vehicle, or a view outside of the vehicle. The triggering event may be detected by a vehicle monitoring system mounted in the vehicle. The vehicle monitoring system may be coupled to an on-board diagnostic system in the vehicle, and the triggering event may be detected from data received from the on-board diagnostic system.

The triggering event may be detected using signals received from an on-board diagnostic system in the vehicle. This may be a speeding violation, an impact detection, a seatbelt warning, or a use of a wireless device, for example. The specified period of time captured in the saved video is configurable based upon a type of triggering event. The saved portion of video data may be a still image or may further include audio data. The saved portions of video data are provided to a database outside of the vehicle, for example, to be reviewed and analyzed.

In one embodiment a system and method of capturing vehicle video, comprises capturing video data associated with triggering events that occur in a vehicle, wherein the video data is a view of occupants of the vehicle, saving the video data as a file with a name corresponding to the associated triggering event, and providing one or more saved video data files to a database outside of the vehicle. The video data files may be reviewed, searched using the video data file name, grouped according to triggering events using the video data file name, prioritized for review using the video data file name, or searched for with a selected triggering event using the video data file name. The video data files may be provided to the database via a wireless connection, a hardwired connection, or via a memory storage device.

In another embodiment, a system for capturing vehicle video, comprises one or more video data recorders mounted in the vehicle, wherein the video data recorders provide a stream of video data, one or more buffers for capturing, at least temporarily, the video data streams from the one or more video data recorders, a vehicle monitoring system coupled to the one or more video data recorders and the buffers, and a video data storage device for storing video data files comprising at least a portion of a video data stream. The vehicle monitoring system identifies an occurrence of a preselected event and, in response, causes one or more video data files to be saved to the video storage device. The vehicle monitoring device is coupled to an on-board diagnostic system in the vehicle. The preselected event may be the occurrence of certain parameters in the on-board diagnostic system. The preselected event is a potential speeding violation, a potential collision, a potential seatbelt violation, or a potential use of a wireless device in the vehicle. The video data files are labeled using a term associated with an event that was detected at the time the video data was captured.

A method for saving video data captured in a vehicle, comprises saving a video data file comprising video captured from inside a vehicle within a selected period of time of an event, and naming the saved video data file using a label associated with the event.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
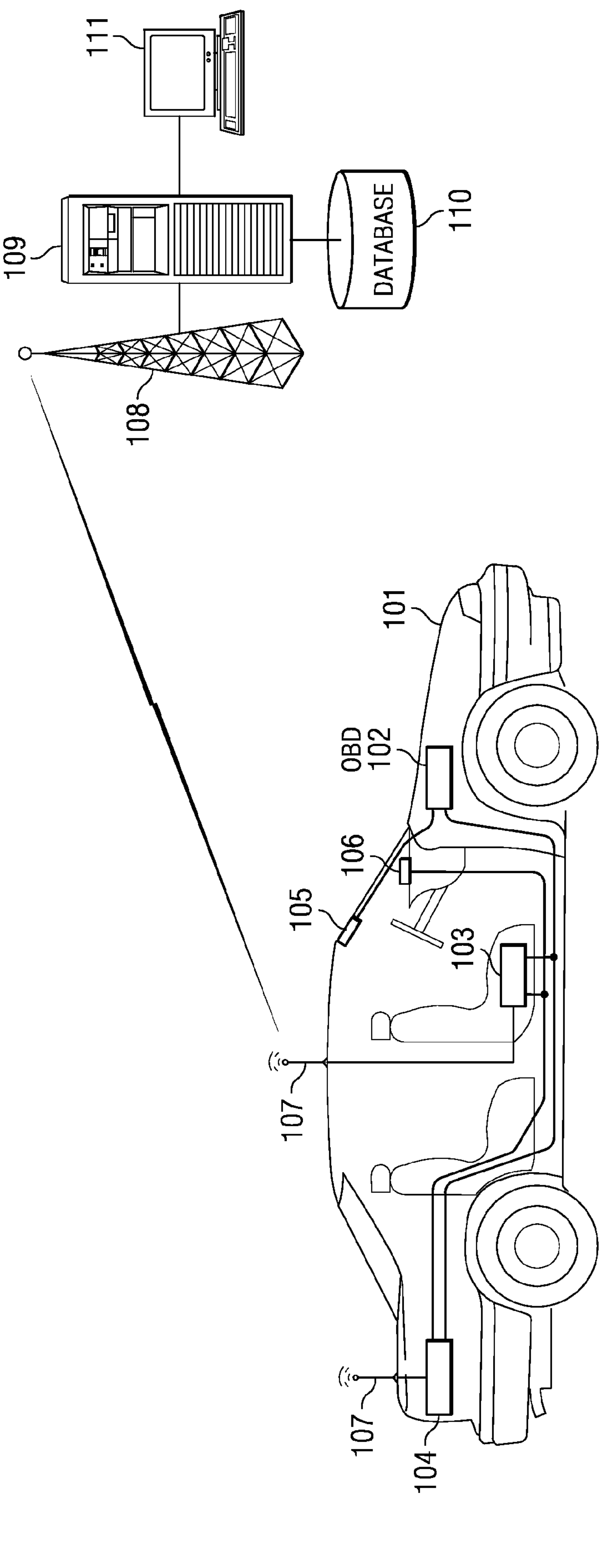
FIG. 1 is a block diagram of a system incorporating embodiments of the invention.

With reference now to FIG. 1, there is shown a vehicle 101 in which a vehicle monitoring device is installed. The monitoring device may be self contained, such as a single unit mounted on a windshield 105 or dashboard 106. Alternatively, the monitoring device may include multiple components, such as a processor or central unit mounted under a car seat 103 or in a trunk 104. Similarly, the monitoring device may have a self-contained antenna in the unit (105), or may be connected to remotely mounted antennas 107. The vehicle monitoring units may be connected to an on-board diagnostic (OBD) system 102 or bus in the vehicle. Information and data associated with the operation of the vehicle may be collected from the OBD system,102, such as engine operating parameters, vehicle identification, seatbelt use, door position, etc. The OBD system 102 may also be used to power the vehicle monitoring device. In one embodiment, the vehicle monitoring device is of the type described in U.S. patent application Ser. No. 11/805,237, filed on May 22, 2007, entitled "System and method for Monitoring Vehicle Parameters and Driver Behavior," the disclosure of which is hereby incorporated by reference herein.

Figure 2:
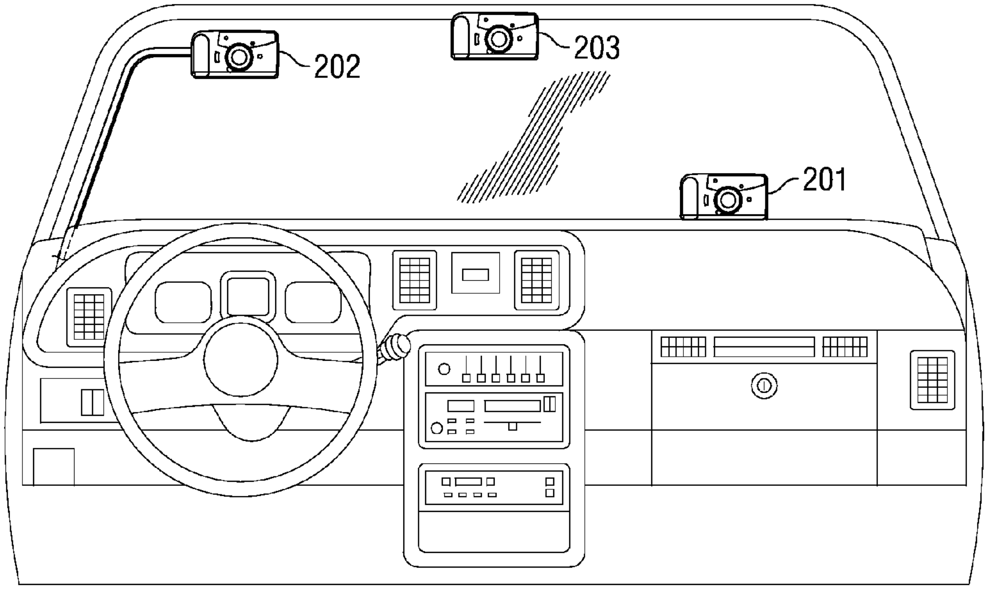
FIG. 2 is a diagram of the location of cameras used in embodiments of the invention.

The vehicle monitoring system may include a camera or any other digital video recording device. Referring to FIG. 2, the camera may be mounted on the vehicle's dashboard 201, windshield 202, headliner 203, or any other location that allows for video capture of at least the driver of the vehicle while the vehicle is in operation. The camera may be incorporated into a vehicle monitoring device that is mounted on the vehicle's windshield 105 or dashboard 106. Alternatively, a camera sensor mounted on a dashboard or windshield may be coupled to a remotely mounted vehicle monitoring device 103, 104. The recorded video information may be stored at the camera location (e.g. 105, 106) or in a remote monitoring device (e.g. 103, 104).

The video data may also be transmitted in real-time or at intervals from the vehicle monitoring system to a central monitoring system or server for storage and/or processing. For example, the video may be transmitted to server 109 via communication network 108, which may be a cellular, satellite, WiFi, Bluetooth, infrared, ultrasound, short wave, microwave or any other suitable network. Server 109 may process the video data and/or store the video data to database 110, which may be part of server 109 or a separate device located nearby or at a remote location. Users can access the video data files on server 109 and database 110 using terminal 111, which may be co-located with server 109 and database 110 or coupled via the Internet or other network connection. Is some embodiments, the video data captured by the monitoring system in vehicle 101 may be transmitted via a hardwired communication connection, such as an Ethernet connection that is attached to vehicle 101 when the vehicle is within a service yard or at a base station. Alternatively, the video data may be transferred via a flash memory, diskette, or other memory device that can be directly connected to server 109 or terminal 111.

Video data formats are well known and it is understood that the present invention may use and store video data in any compressed or uncompressed file format now known or later developed, including, for example, the Moving Picture Experts Group (MPEG), Windows Media Video (WMV), or any other file format developed by the International Telecommunication Union (ITU), International Organization for Standardization (ISO), International Electrotechnical Commission (IEC) or other standards body, company or individual.

In one embodiment of the invention, the captured video is used to monitor, mentor or other wise analyze a driver's behavior during certain events. For example, if the vehicle is operated improperly, such as speeding, taking turns too fast, colliding with another vehicle, or driving in an unapproved area, then a supervisor may want to view the driver video recorded during those events to determine what the driver was doing at that time and if the driver's behavior can be improved. Additionally, if the driver's behavior is inappropriate or illegal, such as not wearing a seatbelt or using a cell phone while driving, but does not cause the vehicle to operate improperly, a supervisor may also want to review the video recorded during those events. Accordingly, it would be helpful to a user, such as a supervisor, fleet manager, driving instructor, parent, vehicle owner or other authority (collectively hereinafter a "supervisor") to have the capability to quickly identify a portion of a driver video record that is associated with such vehicle misuse or improper driver behavior. The supervisor could then analyze the video and provide feedback to the driver to correct the improper or illegal driving behavior.

Figure 3:
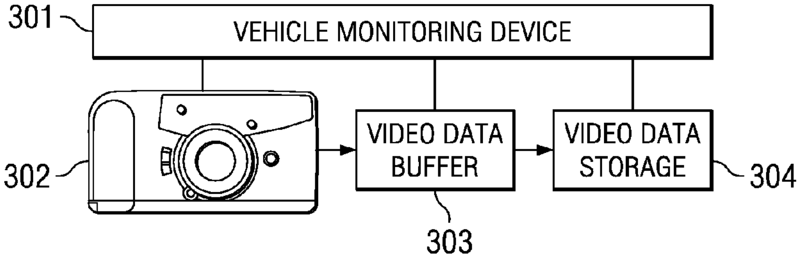
FIG. 3 is a block diagram of a system incorporating embodiments of the invention.

FIG. 3 is a block diagram of one embodiment of a video capturing system according to one embodiment of the invention. Vehicle monitoring device 301 is mounted anywhere appropriate in the vehicle. Camera or digital video recording device 302 is mounted on the windshield, dashboard, or headliner, for example, so that the driver will be in the field of view. Camera 302 outputs a stream of video data to video data buffer 303. When commanded by vehicle monitoring device 301, video data buffer 303 stores portions or clips of the video data stream to video data storage 304. The video data stream may also, or alternatively, be fed directly to video data storage 304 so that most or all of the video stream is captured. In one embodiment, the video data stream corresponds to video of the driver that is captured during operation of the vehicle.

Video of the passengers and other occupants of the vehicle may also be captured in addition to the driver video data. In other embodiments, more than one camera or video recording device is used in order to capture multiple views simultaneously, such as, for example, a driver view, a passenger view, a view looking forward out of the vehicle, an instrument panel view, and/or a side view. The camera mounting locations are not limited to the windshield, dashboard or headliner, but may be placed anywhere inside or outside of the vehicle and may be oriented to view into or out of the vehicle. Accordingly, multiple video data streams, clips or files may be provided to video data buffer 303 and video data storage 304. Alternatively, separate video data buffers 303 and video data storage devices 304 may be assigned to one or more different video data streams.

Vehicle monitoring device 301 is coupled to camera 302, video data buffer 303, and video storage device 304. These may be separate components, one single component, or various ones of the components may be combined into one device. It will be understood that camera 302 may be any video capture device or equipment. Moreover, video data buffer 303 and video storage device 304 may be any appropriate data buffering and storage devices. Vehicle monitoring device 301 detects predetermined events, such as a collision, a speeding violation, or a disconnected seatbelt, and causes video data buffer to capture video data associated with the triggering event. That event video data is then stored to video data storage device 304. The event video data may be one or more still images or a video clip of any preselected length. Preferably, the event video data files are named so that they may easily be searched, identified and recalled by a supervisor. For example, if a speeding violation was detected, the associated event video data clip might be named or labeled "Speeding," "Speeding Violation," or "Speeding x MPH" where "x" is a maximum speed recorded or a speed differential over a posted speed limit.

U.S. patent application Ser. No. 11/805,238, filed May 22, 2007, entitled "System and Method for Monitoring and Updating Speed-By-Street Data," which application is hereby incorporated by reference herein in its entirety, describes the use of speed-by-street data to identify the specific speed limits on a particular street. The vehicle's owner, fleet manager, or other authority may set speeding thresholds that will trigger the capture of video clips associated with speeding. Static thresholds, such as speeds over 70 MPH, and dynamic thresholds, such as speeds 10 MPH over a posted speed limit, may be set. When vehicle monitoring device 301 determines that the vehicle is currently speeding, such as when a speeding threshold is met, an event trigger will be sent to video data buffer 303 causing a video data file associated with that speeding event to be stored to video data storage device 304 and labeled with an appropriately usable file name.

Vehicle monitoring device 301 may send information identifying the triggering event to video data buffer 303 or video data storage device 304 for use in naming the event video files. Either or both of video data buffer 303 or video data storage device 304 may be configured to name the event video files. Alternatively, vehicle monitoring device 301 may determine the appropriate name or label and provide that information to video data buffer 303 or video data storage device 304 to name the stored file. Other information or criteria in addition to triggering event identifier may be provided to name the file. For example, if a collision or impact is detected, the event video data may be simply named "Collision" or "Possible Impact." If additional information is available from monitoring device 301, a more detailed label may be generated, such as "Collision—forward quarter," "Rear Impact," or "Impact Delta V x" where "x" is a measured or observed Delta V during the collision.

As disclosed in the above-cited U.S. patent application Ser. No. 11/805,237, one embodiment of the vehicle monitoring device receives inputs from accelerometers and/or a crash data recorder that measures "g" forces on the vehicle. These forces may indicate collisions, turning too fast, jackrabbit starts, hard braking or other extreme driving maneuvers. If the vehicle monitoring system detects such forces or identifies a potential collision or impact, an event trigger will be sent to video data buffer 303 causing a video data file associated with that acceleration or impact event to be stored to video data storage device 304 and labeled with an appropriately usable file name.

The device could be collecting video continuously to a buffered memory and once a specified event threshold is exceeded the device collects some configurable amount of video in the past as well as some configurable amount of video into the future (post infraction) and then saves said video to a file whereas the infraction that caused the data capture is coded into the file name. In the alternative, the device could be off and quickly triggered once an infraction or activity of interest is detected. However, such an arrangement would prevent the capture of, video of past events.

Figure 4:
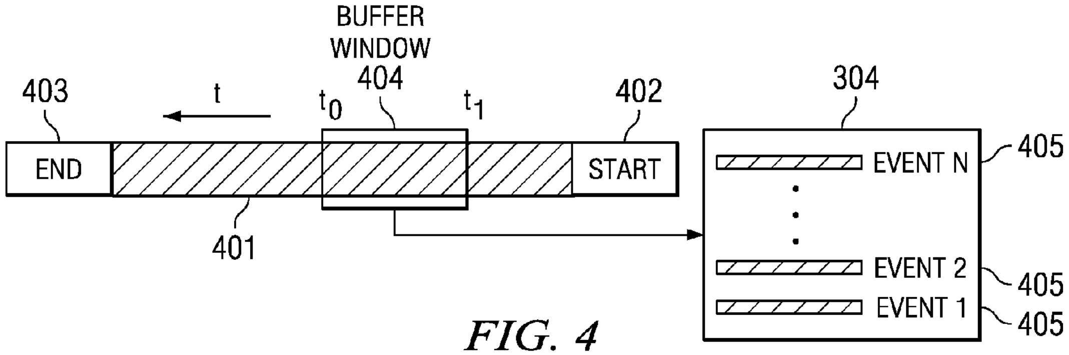
FIG. 4 is an illustration of video data capture according to embodiments of the invention.

FIG. 4 illustrates the processing and storing of video data according to exemplary embodiments of the invention. Video data stream 401 represents the video data captured by camera 302 and provided to video data buffer 303. Video data stream 401 may be in any appropriate format. Video data stream 401 begins at start time 402, which may correspond to the movement of the vehicle's key to an "on" or "ignition" position, the start of the vehicle's engine, the start of a selected route, entry into a designated area, a predetermined time, or any other time event. Video data stream 401 flows in the direction "t" illustrated until end 403, which may correspond to the movement of the vehicle's key to an "off" position, the shutdown of the vehicle's engine, the end of a selected route, exit form a designated area, a predetermined time, or any other time or event.

Buffer window 404 represents an amount of video data that is stored in video data buffer 303. Accordingly, a portion of the video data stream 401 from the current time ($t_0$) to some time in the past ($t_1$) is captured in the video data buffer 303. The period from $t_0$ to $t_1$ is the size of the buffer window, such as 15 seconds, 30 seconds, 2 minutes, etc. The buffer window size may be adjustable depending upon the detected event and the supervisor's settings. For example, the supervisor may not want to view any video clips longer than 30 seconds, so the video buffer is set to a 30 second size. Whenever a triggering event is detected, such as speeding or a collision, the data in the video buffer is captured and stored to video data storage device 304. This allows the supervisor to later observe some period of time (e.g. 30 seconds) leading up to the event. The video buffer and video storage device may be further configured to allow additional video to be captured following the triggering event so that the supervisor may observe some period of time before and after the event. For example, if the buffer size was 30 seconds and the system was configured to capture 10 seconds of video following the triggering event before storing the video clip, then the supervisor could later view the 20 seconds leading up to the event and 10 seconds after the event.

It will be understood that the size of buffer window 404 and the amount of video data captured to individual data files is configurable and may be of any size supported by the available equipment. In another embodiment, the type of triggering event may determine how much time the video clip should capture. Vehicle monitoring device 301 may receive inputs from the vehicle OBD, such as a seatbelt warning, and inputs from other sensors, such as a cell phone use detector. If the driver or a passenger does not use his or her seatbelt, vehicle monitoring device 301 will detect the seatbelt warning on the OBD bus. If the cell phone use detector observes a wireless device being used in or near the vehicle, an input is sent to the vehicle monitoring device 301. In either case, vehicle monitoring device 301 sends a event trigger to video data buffer 303 to capture the driver video. A supervisor may not want to watch 30 seconds or more of the driver talking on a cell phone or not wearing a seatbelt. Instead, they simply need to visually confirm that the violation occurred. Accordingly, the system may be configured to capture a shorter video clip, such as 10 seconds, or a still image when a seatbelt, cell phone use or similar event is detected. On the other hand, for speeding violations, collisions, and aggressive driving triggers, the system may be configured to capture longer video clips.

As illustrated in FIG. 4, the captured video clips 405 are stored to video data storage device 304. Each video clip, which may be of any length or may be a still image, is named so that the files may be easily searched and recalled, as noted above. For example, seatbelt and cellular phone use may simply be named "seatbelt" or "cell phone," while other events, such as speeding and collisions may be assigned more detailed names. Additional information, such as a date/time stamp, driver name, vehicle identifier, fleet identifier, or the like may also be added to the file name or as additional data added to the file itself. The additional information may be visible or not visible when the video clip is played or observed.

Video data storage 304 may be located in the vehicle and, at the end of the shift, trip or route (403), video clips 405 may be transferred to server 109 or database 110 (FIG. 1), such as by wireless communication over network 108 or by hardwire or Ethernet connection. Vehicle monitoring device 301 may also have a USB port, memory card slot, diskette recording device or other equipment for transferring video clips to a flash drive, memory card, diskette, compact disk, or other memory device. Video clips 405 may then be loaded to server 109 or database 110 directly or remotely, for example, via terminal 111.

Once the video clips are loaded to server 109 and/or database 110, a supervisor may review all of the video files for a particular shift, trip, or route. The files for a particular driver, group of drivers, day, group of day, vehicle, fleet, or all the video files may also be viewed. The supervisor may search, sort and prioritize the video clips using the file names. For example, if the supervisor wanted to see all video clips associated with speeding, the word "speed" could be used as a search term, using any standard file search tool, to find all of the speeding video clips. Similarly, reports on the video clips could be generated using the file names, such as whether there were incidents of speeding, collisions, seatbelt misuse, or the like during a particular shift. The file naming convention described herein allows the supervisor to immediately identify the relevance of each video file and to recall only those files of interest.

Any event or time can be selected as a trigger for capturing video data. It is expected that different users may configure a vehicle monitoring system to capture specific events based upon their use of the vehicle. For example, a parent may configure the device to capture video of potential speeding, impact, seatbelt, and cell phone use violations or events. On the other hand, a fleet operator may record video of those events in addition to capturing video of other events, such as video from particular routes, stops, deliveries, or pick-ups. The monitoring system may be configured to use any OBD data or other sensor data to trigger video capture. For example, if the OBD senses an open vehicle door or if a specific sensor is installed to detect when a vehicle door opens, that event can be used to trigger video capture of the driver and vehicle occupants, which may be useful for example in the taxi, livery, bus, or other commercial transportation industries. Similarly, the start of a taxi meter my trigger video capture of the vehicle occupants.

Additionally, the opening and/or closing of a driver's door and/or passenger door may also constitute a triggering event. Also, the sitting position and/or feedback from seat sensors regarding weight, posture, placement, and/or positioning may constitute a trigger-able event. For example, detecting a condition indicating that a child is riding in the front seat, such as the passenger's positioning, posture, weight, and/or the like, may trigger video capture of the passenger seat occupant. It will be understood that any exception condition or parameters may be selected to trigger video recording and that the captured video files may be named using a descriptive or meaningful label or tag associated with the triggering event.

The present invention may also be used to capture audio data in addition to or instead of video data. The audio data may be captured using microphones mounted with the video recording device or using separate microphones. The audio data may be saved in the same data file as the corresponding video data, or may be saved in separate audio data files. The audio data files may be named in the same descriptive manner as described herein for video data files.

Table 1 illustrates a list of file names for saved video clips according to one embodiment of the invention. The saved video clips are labeled so that the video clip can be correlated to specific violations. The file names illustrate that, for this example trip on May 21, 2006, the driver failed to use a seatbelt at the beginning of the drive at 3:01 PM. The time and date stamp may be as specific as desired by the user, such as including the year and seconds as shown. Alternatively, the file name may just include the violation type without any further details, or may include a sequential identification of the violations, such as "Speeding 1," "Speeding 2," "Speeding 3" etc. If the seatbelt remains unattached, the system may be configured to record and label an appropriate video clip every 15 minutes or some other longer or shorter repetition interval to prevent a constant stream of seatbelt violations from being recorded.

TABLE 1

| |
|---|
| VHCL1_SEATBELT_052106_15.01.04 |
| VHCL1_SPEED_052106_15.21.56 |
| VHCL2_CELL PHONE_052106_15.36.06 |
| VHCL2_SPEED_052106_15.36.40 |
| VHCL1_BRAKE_05212006_15.25.16 |
| VHCL2_SPEED_052106_16.35.21 |
| VHCL3_HARD ACCEL_052106_17.15.56 |
| VHCL1_SPEED_052106_16.52.06 |
| VHCL2_BRAKE_05212006_17.25.16 |
| VHCL2_IMPACT_052106_17.25.18 |

The vehicles or drivers in the example shown in Table 1 are identified in the file name using the VHCLx field. This identifier could be a vehicle's fleet number, license number, VIN, the number of the vehicle monitoring unit's cell, satellite, or modem, or a driver identifier. The video files may be searched and sorted by the vehicle/driver identifier field, which allows files from multiple vehicles to be processed or reviewed at the same time. In Table 1, video file names for data from three vehicles are illustrated. These vehicles had potential speeding, acceleration, seatbelt and cell phone violations.

Additional detail may be included in the file name, such as a speeding amount, such as "Speeding 10" or "Speeding 15," to show the extent of the speeding violation. The driver clips of Table 1 show that the driver had a hard brake (i.e. deceleration) and an impact or collision at 17:25 PM. If the system assigned file names as shown in Table 1, then the user could jump straight to content of interest, such as to view the video of an impact. Alternatively, the file listing could be sorted, searched, or otherwise organized using commonly available file search tools.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for monitoring, recording and storing various types of event data detected during operation of a vehicle in a manner that facilitates retrieval of stored event data by selecting for a particular vehicle retrieval of one or more types of events related to at least one of i) operation of the vehicle, ii) use of vehicle equipment, iii) operator behaviors while in the vehicle, or iv) passenger behaviors while in the vehicle, the computer-implemented method comprising:

- detecting at one or more sensors installed in a vehicle one or more parameters from which data is derived that defines various types of events related to at least one of i) operation of the vehicle, ii) use of vehicle equipment, iii) operator behaviors while in the vehicle, or iv) passenger behaviors while in the vehicle;
- for each type of event, configuring a time period over which a triggered event is to be recorded;
- receiving at a processing system inputs from said one or more sensors, the inputs from said one or more sensors being analyzed by one or more processors of the processing system to determine triggering events that determine when an event type is to be recorded and stored;
- recording at one or more digital video monitors installed in the vehicle one or more behaviors for at least one of the vehicle operator, the vehicle passenger, a view inside the vehicle, or a view outside the vehicle;
- for each instance of a triggering event, storing in a data storage device a portion of digital video recorded over the configured time period for the triggered event, and storing the recorded portion of digital video in a digital format that is identified by the type of event that is triggered; and
- for a given vehicle, and for a selected type of event, retrieving from data storage for separate presentation all stored instances of the recorded digital video for a selected type of event over a given time period.

2. The method of claim 1, wherein the configured time period includes at least one of a time prior to the event and a time after the event.

3. The method of claim 1, wherein the configured time period includes at least both a time prior to the event and a time after the event.

4. The method of claim 1, wherein the video data is video of a driver of the vehicle.

5. The method of claim 1, wherein the video data is video of one or more passengers of the vehicle.

6. The method of claim 1, wherein the video data is video of a view outside of the vehicle.

7. The method of claim 1, wherein the processing system in included in a vehicle monitoring system mounted in the vehicle.

8. The method of claim 7, wherein the one or more sensors are part of an on-board an on-board diagnostic system in the vehicle, and wherein the on-board diagnostic system is coupled to the vehicle monitoring system.

9. The method of claim 7, wherein the data storage device is included in the vehicle monitoring system.

10. The method of claim 9, wherein a database is stored outside of the vehicle, and wherein the method further comprises transmitting from the vehicle monitoring system to the database the portion of digital video recorded for each triggering event.

11. The method of claim 10, wherein the transmission is wireless.

12. The method of claim 11, wherein the transmission is automatically initiated by the vehicle monitoring system when the vehicle is returned to a fleet vehicle base.

13. The method of claim 10, wherein the stored portion of digital video is temporarily stored in a buffer and then automatically wirelessly transmitted from the buffer to the database.

14. The method of claim 1, wherein at least one of the triggering events is a speeding violation.

15. The method of claim 1, wherein at least one of the triggering events is an impact detection.

16. The method of claim 1, wherein at least one of the triggering events is a seatbelt warning.

17. The method of claim 1, wherein at least one of the triggering events is a detection of a use of a wireless device.

18. The method of claim 1, wherein at least one of the triggering events is detected by a seat sensor.

19. The method of claim 18, wherein an input that is used to detect the triggering event from the seat sensor is selected from the group consisting of:

- a weight;
- a passenger size;
- an occupant's position;
- an occupant's posture; and
- a placement of an object on a seat.

20. The method of claim 1, wherein the stored portion of video data is a still image.

21. The method of claim 1, wherein the stored portion of video data comprises audio data.

22. The method of claim 1, further comprises retrieving from data storage all stored instances of the recorded digital video for each type of event over a given time period, and prioritizing presentation of the retrieved instances based on the types of events.

23. A system for monitoring, recording and storing various types of event data detected during operation of a vehicle in a manner that facilitates retrieval of stored event data by selecting for a particular vehicle retrieval of one or more selected types of events related to at least one of i) operation of the vehicle, ii) use of vehicle equipment, iii) operator behaviors while in the vehicle, or iv) passenger behaviors while in the vehicle, the system comprising:

- one or more sensors installed in a vehicle for detecting one or more parameters from which data is derived that defines various types of events related to at least one of i) operation of the vehicle, ii) use of vehicle equipment, iii) operator behaviors while in the vehicle, or iv) passenger behaviors while in the vehicle;
- a processing system for configuring a time period over which a triggered event is to be recorded, and for receiving one or more inputs from said one or more sensors, the processing system comprising one or more processors digitally processing said inputs from said one or more sensors to determine triggering events that determine when an event type is to be recorded and stored;
- one or more monitors installed in the vehicle for recording one or more behaviors for at least one of the vehicle operator, the vehicle passenger, a view inside the vehicle, or a view outside the vehicle;
- a data storage device for storing a portion of digital video recorded over the configured time period for each instance of a triggering event, and for storing the recorded portion of digital video in a digital format that is identified by the type of event that is triggered; and
- an output device for retrieval from data storage and for separate presentation all stored instances of the recorded digital video for a selected type of event over a given time period.

24. The system of claim 23, wherein the configured time period includes at least one of a time prior to the event and a time after the event.

25. The system of claim 23, wherein the configured time period includes at least both a time prior to the event and a time after the event.

26. The system of claim 23, wherein the video data is video of a driver of the vehicle.

27. The system of claim 23, wherein the video data is video of one or more passengers of the vehicle.

28. The system of claim 23, wherein the video data is video of a view outside of the vehicle.

29. The system of claim 23, wherein the processing system in included in a vehicle monitoring system mounted in the vehicle.

30. The system of claim 29, wherein the one or more sensors are part of an on-board an on-board diagnostic system in the vehicle, and wherein the on-board diagnostic system is coupled to the vehicle monitoring system.

31. The system of claim 29, wherein the data storage device is included in the vehicle monitoring system.

32. The system of claim 31, wherein a database is stored outside of the vehicle, and wherein the method further comprises transmitting from the vehicle monitoring system to the database the portion of digital video recorded for each triggering event.

33. The system of claim 32, wherein the transmission is wireless.

34. The system of claim 32, wherein the transmission is automatically initiated by the vehicle monitoring system when the vehicle is returned to a fleet vehicle base.

35. The system of claim 32, wherein the stored portion of digital video is temporarily stored in a buffer and then automatically wirelessly transmitted from the buffer to the database.

36. The system of claim 23, wherein at least one of the triggering events is a speeding violation.

37. The system of claim 23, wherein at least one of the triggering events is an impact detection.

38. The system of claim 23, wherein at least one of the triggering events is a seatbelt warning.

39. The system of claim 23, wherein at least one of the triggering events is a detection of a use of a wireless device.

40. The system of claim 23, wherein at least one of the triggering events is detected by a seat sensor.

41. The system of claim 40, wherein an input that is used to detect the triggering event from the seat sensor is selected from the group consisting of:

a weight;
a passenger size;
an occupant's position;
an occupant's posture; and
a placement of an object on a seat.

42. The system of claim 23, wherein the stored portion of video data is a still image.

43. The system of claim 23, wherein the stored portion of video data comprises audio data.

44. The system of claim 23, wherein all stored instances of the recorded digital video for each type of event are retrieved for a given time period, and presentation of the retrieved instances is based on the types of events.

45. One or more digital storage devices containing computer-executable instructions for causing one or more processors of a computing system to implement a method for storing various types of event data detected during operation of a vehicle in a manner that facilitates retrieval of stored event data by selecting for a particular vehicle retrieval of one or more selected types of events related to at least one of i) operation of the vehicle, ii) use of vehicle equipment, iii) operator behaviors while in the vehicle, or iv) passenger behaviors while in the vehicle, the computer-implemented method comprising:

receiving at a processing system inputs from any of a plurality of sensors installed in a vehicle, the sensors detecting parameters from which data is derived that defines various types of events related to at least one of i) operation of the vehicle, ii) use of vehicle equipment, iii) operator behaviors while in the vehicle, or iv) passenger behaviors while in the vehicle;

for each type of event, configuring at a processing system a time period over which a triggered event is to be recorded;

receiving at the processing system inputs from said one or more sensors, the inputs from said one or more sensors being analyzed by one or more processors of the processing system to determine triggering events that determine when an event type is to be recorded and stored;

recording at one or more digital video monitors installed in the vehicle one or more behaviors for at least one of the vehicle operator, the vehicle passenger, a view inside the vehicle, or a view outside the vehicle;

for each instance of a triggering event, storing in a data storage device a portion of digital video recorded over the configured time period for the triggered event, and storing the recorded portion of digital video in a digital format that is identified by the type of event that is triggered; and for a given vehicle, and for a selected type of event, retrieving from data storage for separate presentation all stored instances of the recorded digital video for a selected type of event over a given time period.

* * * * *

UNITED STATES PATENT AND TRADEMARK OFFICE
CERTIFICATE OF CORRECTION

PATENT NO. : 8,666,590 B2
APPLICATION NO. : 11/767325
DATED : March 4, 2014
INVENTOR(S) : Follmer et al.

It is certified that error appears in the above-identified patent and that said Letters Patent is hereby corrected as shown below:

In the Specification

<u>Column 3</u>
Line 45, change “Is some” to --In some--
Line 65, change “other wise” to --otherwise--

<u>Column 4</u>
Line 50, change “various ones of the components may” to --various components that may--

<u>Column 5</u>
Line 56, change “of, video” to --of video--

<u>Column 6</u>
Line 41, change “a event” to --an event--
Line 64, change “storage 304” to --storage device 304--
Line 65, change “route (403)” to --route 403--

<u>Column 7</u>
Line 40, change “my” to --may--

<u>Column 9</u>
Line 48, change “system in” to --system is--
Line 52, change “an on-board an on-board” to --an on-board--

Signed and Sealed this
Fifteenth Day of July, 2014

Michelle K. Lee
*Deputy Director of the United States Patent and Trademark Office*